(12) United States Patent
Kirchhoff (10) Patent No.: US 10,645,852 B2
(45) Date of Patent: May 12, 2020

(54) FINGER WEEDING TOOL FOR A SOIL CULTIVATION DEVICE, METHOD FOR MECHANICALLY FIGHTING WEEDS IN ROW PLANTINGS

(71) Applicant: K.U.L.T. Kress Umweltschonende Landtechnik GmbH, Vaihingen/Enz (DE)

(72) Inventor: Christian Kirchhoff, Vaihingen/Enz (DE)

(73) Assignee: K.U.L.T. Kress Umweltschonende Landtechnik GmbH, Vaihingen/Enz (DE)

( * ) Notice: Subject to any disclaimer, the term of this patent is extended or adjusted under 35 U.S.C. 154(b) by 0 days.

(21) Appl. No.: 16/070,921

(22) PCT Filed: Jan. 18, 2017

(86) PCT No.: PCT/DE2017/100024
§ 371 (c)(1),
(2) Date: Jul. 18, 2018

(87) PCT Pub. No.: WO2017/133724
PCT Pub. Date: Aug. 10, 2017

(65) Prior Publication Data
US 2019/0021206 A1   Jan. 24, 2019

(30) Foreign Application Priority Data

Feb. 3, 2016   (DE) .................. 10 2016 001 416

(51) Int. Cl.
*A01B 39/18* (2006.01)
*A01B 1/18* (2006.01)
*A01B 39/08* (2006.01)

(52) U.S. Cl.
CPC ............... *A01B 1/18* (2013.01); *A01B 39/08* (2013.01); *A01B 39/18* (2013.01)

(58) Field of Classification Search
CPC ............ A01B 1/18; A01B 39/08; A01B 39/18
See application file for complete search history.

(56) References Cited

U.S. PATENT DOCUMENTS 2,215,364 A    9/1940  Simmons et al.
2,912,055 A *  11/1959 Buddingh .............. A01B 39/08
                                              172/526
(Continued)

FOREIGN PATENT DOCUMENTS

CA   1 054 841 A     5/1979
DE   196 07 602 C2   9/1997
(Continued)

OTHER PUBLICATIONS

Letter from the European Patent Attorney to the European Patent Office in PCT/DE2017/100024, dated Jun. 12, 2017, with English translation of relevant parts.
(Continued)

*Primary Examiner* — Matthew Troutman
(74) *Attorney, Agent, or Firm* — Collard & Roe, P.C.

(57) ABSTRACT

A finger-hoe tool for a soil-tilling device, which has at least one finger, and a method for mechanical control of weeds in row crops make possible an input of loose materials into the row or a discharge of loose materials from the row, because the at least one finger has at least one device for collection and/or removal of the loose materials (e.g. earth, sand, stones), whereby not only the weakly rooted weeds but also more strongly rooted weeds can be controlled.

7 Claims, 9 Drawing Sheets

(56) References Cited

U.S. PATENT DOCUMENTS

| | | | | |
|---|---|---|---|---|
| 3,082,829 A | * | 3/1963 | Buddingh | A01B 39/08 172/184 |
| 3,212,585 A | * | 10/1965 | Bezzerides | A01B 39/08 172/142 |
| 3,306,371 A | * | 2/1967 | Bush | A01B 39/08 172/540 |
| 4,312,409 A | | 1/1982 | Mills | |
| 4,646,850 A | | 3/1987 | Brown et al. | |
| 4,817,732 A | * | 4/1989 | Brown | A01B 35/16 172/548 |
| 5,588,382 A | * | 12/1996 | Embree | A01B 35/16 111/139 |
| 8,631,879 B1 | * | 1/2014 | Martin | A01C 5/062 172/540 |
| 10,238,021 B2 | * | 3/2019 | Kirchhoff | A01B 39/18 |
| 2017/0099769 A1 | * | 4/2017 | Badalini | A01D 34/66 |
| 2018/0077847 A1 | * | 3/2018 | Kirchhoff | A01B 39/18 |

FOREIGN PATENT DOCUMENTS

| | | |
|---|---|---|
| EP | 1 116 427 A1 | 7/2001 |
| EP | 1 127 481 B1 | 8/2001 |

OTHER PUBLICATIONS

International Search Report of PCT/DE2017/100024, dated May 4, 2017.

\* cited by examiner

Fig. 1

STAND DER TECHNIK

Schnitt A-A

Schnitt A-A

FINGER WEEDING TOOL FOR A SOIL CULTIVATION DEVICE, METHOD FOR MECHANICALLY FIGHTING WEEDS IN ROW PLANTINGS

CROSS REFERENCE TO RELATED APPLICATIONS

This application is the National Stage of PCT/DE2017/100024 filed on Jan. 18, 2017, which claims priority under 35 U.S.C. § 119 of German Application No. 10 2016 001 416.4 filed on Feb. 3, 2016, the disclosure of which is incorporated by reference. The international application under PCT article 21(2) was not published in English.

PRIOR ART

The invention relates to a finger-hoe tool for a soil-tilling device, and to a method for mechanical control of weeds in row crops.

Soil-tilling devices that are used simultaneously for mechanical soil tilling and especially for weed control within one or more crop rows have long belonged to the prior art. Thus Patent Specification EP 1 127 481 B1 and European patent application EP 1 116 427 A1 teach a finger hoe for weedkilling, with mechanical drive by soil drive elements, which is equipped with weeding fingers disposed to move in rotation via the soil drive elements. With this already known finger hoe, it is indeed also possible to shift the soil tilling from the space between two rows into the rows without harming the crops, but usually only weakly rooted weeds, which can be pulled out of the soil together with their roots, are controlled thereby.

Furthermore, German Patent Specification DE 196 07 602 C2 teaches a clearing device, provided with a clearing finger, for a sowing machine, U.S. Pat. No. 4,646,850 A teaches a soil-tilling device with soil-tilling tools disposed in star-shaped rotary manner, Canadian Patent CA 1 054 841 A teaches a soil tiller, U.S. Pat. No. 2,215,364 A teaches a cultivator, and U.S. Pat. No. 4, 312,409 A teaches a rotary agricultural hoe.

THE INVENTION AND ITS ADVANTAGES

By comparison, the finger-hoe tool according to the invention for a soil-tilling device, which is provided with at least one finger, and the method according to the invention for mechanical control of weeds in row crops, have the advantage that, since at least one finger is provided with at least one means for collection and/or removal of loose materials (e.g. earth, sand, stones), an input of loose materials into the row or a discharge of loose materials from the row is made possible, whereby not only the weakly rooted weeds but also more strongly rooted weeds can be controlled. Thus, with the finger-hoe tool according to the invention, it is also possible to utilize not only the main effect of uprooting the weeds but also two further effects, namely a heaping effect, which is caused by the input of loose materials into the row and supports the growth of the crops and/or buries strongly rooted weeds, and a plowing effect, which is caused by the discharge of loose materials from the row and by which, for example, earth input during earthing up is again conveyed out of the row after the death of the buried weeds. In the process, the shape of a star wheel (e.g. plastic disk) of a finger-hoe tool according to the invention influences its aggressiveness toward the soil surface, whereby all three effects of the finger-hoe tool according to the invention are influenced.

According to an advantageous configuration of the finger-hoe tool according to the invention, the at least one means for collection and/or removal of loose materials is a projection and/or the at least one means for collection and/or removal of loose materials is a hollow.

According to an additional advantageous configuration of the finger-hoe tool according to the invention, the at least one finger is provided with at least one finger end, on which the means for collection and/or removal of loose materials is disposed.

According to an additional advantageous configuration of the finger-hoe tool according to the invention, the finger-hoe tool is provided at least partly with a structured surface, so that a removal of loose materials is simplified in contrast to a smooth surface.

According to an additional advantageous configuration of the finger-hoe tool according to the invention, the finger-hoe tool is provided at least partly with a textured (e.g. honeycomb-like) surface.

According to an additional advantageous configuration of the finger-hoe tool according to the invention, at least one finger is axially and/or radially curved.

According to an additional advantageous configuration of the finger-hoe tool according to the invention, the finger-hoe tool is made at least partly of plastic. Preferably it is manufactured in the injection-molding process.

According to an advantageous configuration of the inventive method for mechanical control of weeds in row crops by means of a soil-tilling device provided with at least one finger-hoe tool, especially a finger hoe in which the finger-hoe tool is provided with at least one finger, which is provided with at least one means for collection and/or removal of loose materials, whereby an input of loose materials into the row or a discharge of loose materials from the row is made possible depending on device setting of the soil-tilling device (finger hoe), a finger-hoe tool as described herein is used as the finger-hoe tool.

Further advantages and advantageous configurations of the invention can be inferred from the following description, the drawing and the claims.

DRAWING

Preferred exemplary embodiments of the subject matter according to the invention are illustrated in the drawing and will be explained in more detail in the following, wherein.

DESCRIPTION OF THE EXEMPLARY EMBODIMENT

Figure 1:
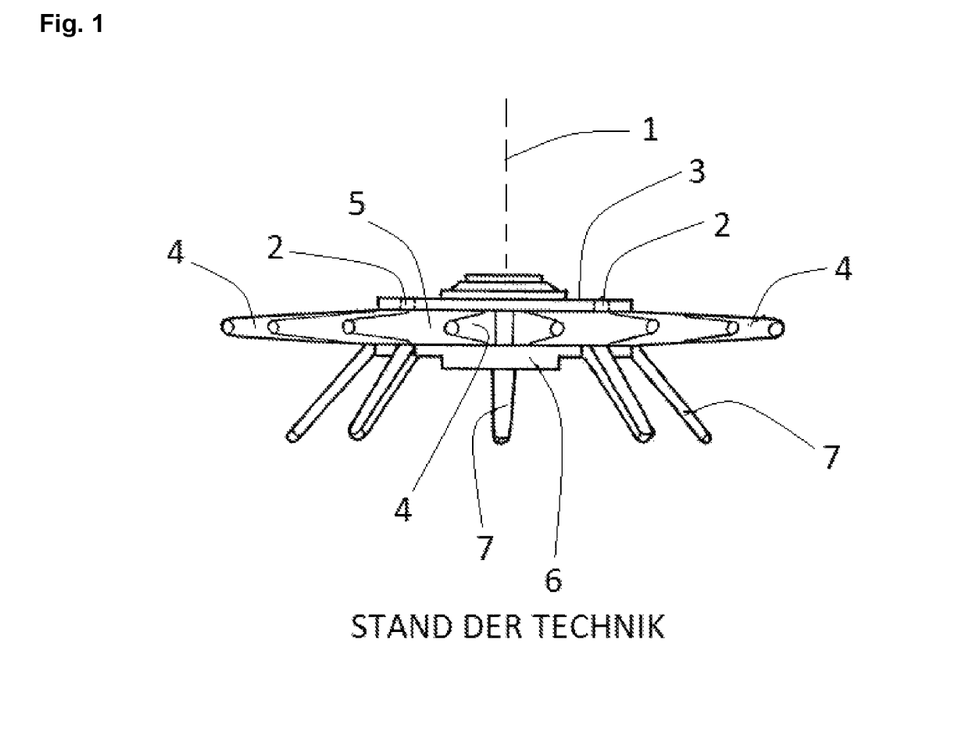
FIG. 1 shows a side view of a finger-hoe tool belonging to the prior art.

FIG. 1 shows a side view of a finger-hoe tool belonging to the prior art, which can be disposed to rotate around an axis of rotation 1 on the soil-tilling device, not illustrated. By means of bolted connections 2, a cover plate 3 is joined to a star wheel 5 provided with several fingers 4 (weeding fingers). The drive of the finger-hoe tool is provided mechanically by means of soil drive elements 7 that penetrate into the soil and are disposed on a drive plate 6, which is connected to the star wheel 5.

Figure 2:
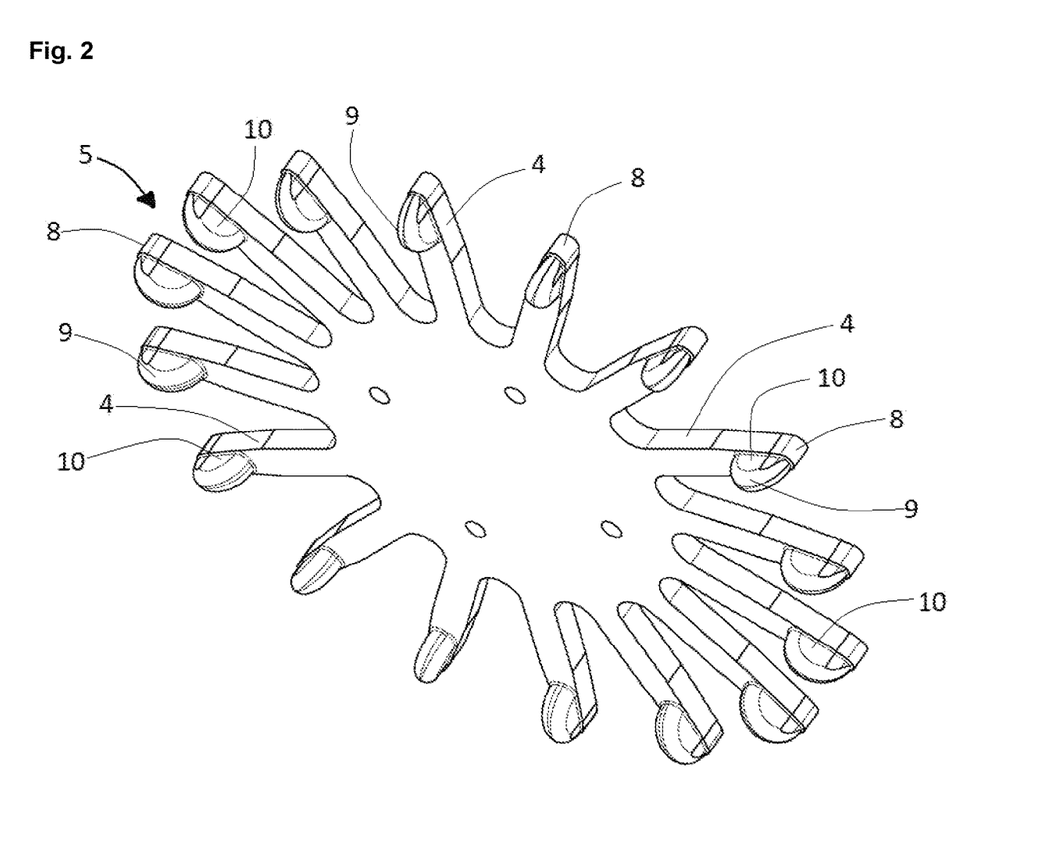
FIG. 2 shows a perspective view of a star wheel belonging to the finger-hoe tool according to the invention.

FIG. 2 shows a perspective view of a star wheel 5 belonging to a finger-hoe tool according to the invention. The fingers 4 are provided with finger ends 8, on which means for collection and/or removal of loose materials are disposed in the form of projections 9. Preferably the projections 9, which do not necessarily have to be present on every finger 4, are disposed on the side of a star wheel 5 turned toward the soil. It is also conceivable for the projections 9 to be disposed on the upper side of a finger 4 or for projections 9 to be disposed on the underside and upper side of fingers 4 or alternatively or additionally laterally on the finger 4. The projections 9 are preferably provided with bowl-shaped indentations 10, which may be disposed on one side of the projection 9, whereby this becomes a scoop, or on both sides of projection 9, and by which a collection and/or removal of loose materials is facilitated.

Figure 3:
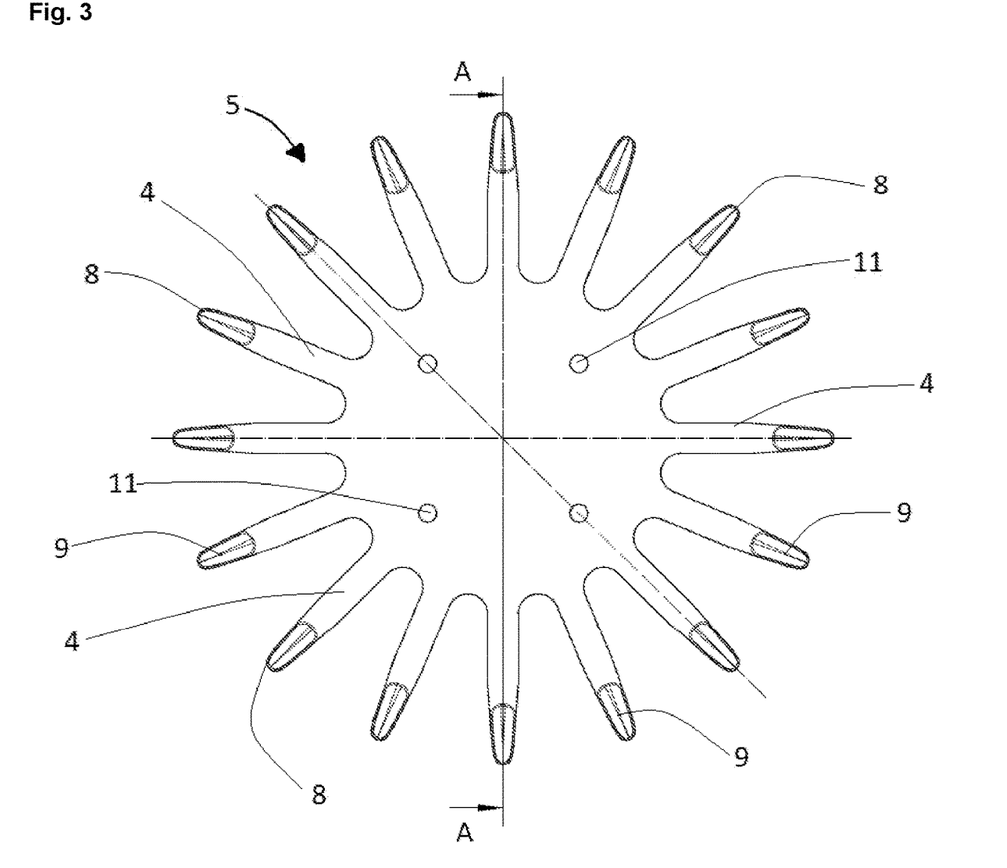
FIG. 3 shows an overhead view of the star wheel according to FIG. 2.

FIG. 3 shows an overhead view of the star wheel 5 according to FIG. 2. Bores 11 permit a bolted connection of the star wheel 5 with a cover plate, not illustrated as well as with a drive plate, not illustrated.

Figure 4:
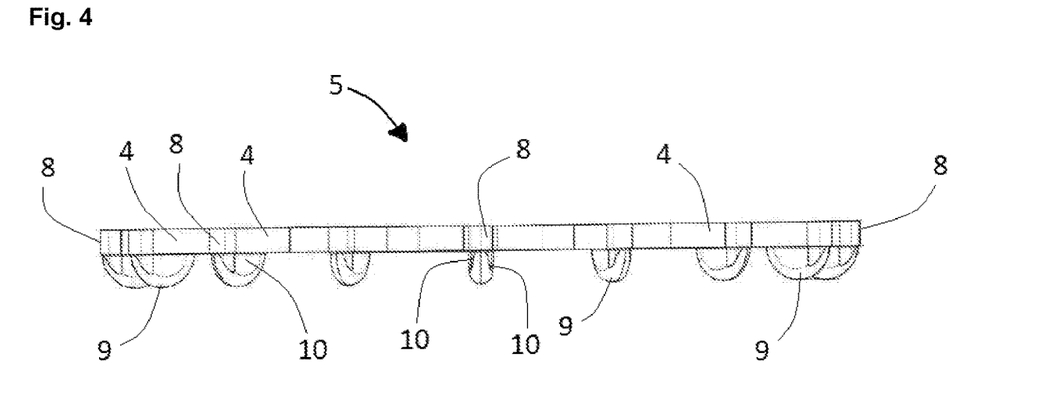
FIG. 4 shows a side view of the star wheel according to FIG. 2.

FIG. 4 shows a side view of the star wheel 5 according to FIG. 2.

Figure 5:
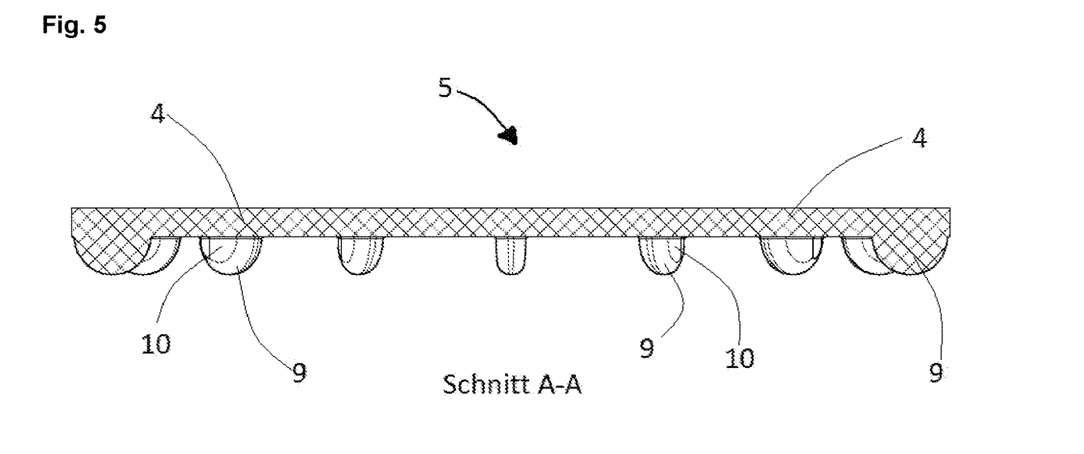
FIG. 5 shows a sectional drawing of the star wheel according to the section line A-A from FIG. 3.

FIG. 5 shows a sectional drawing of the star wheel 5 according to the section line A-A from FIG. 3.

Figure 6:
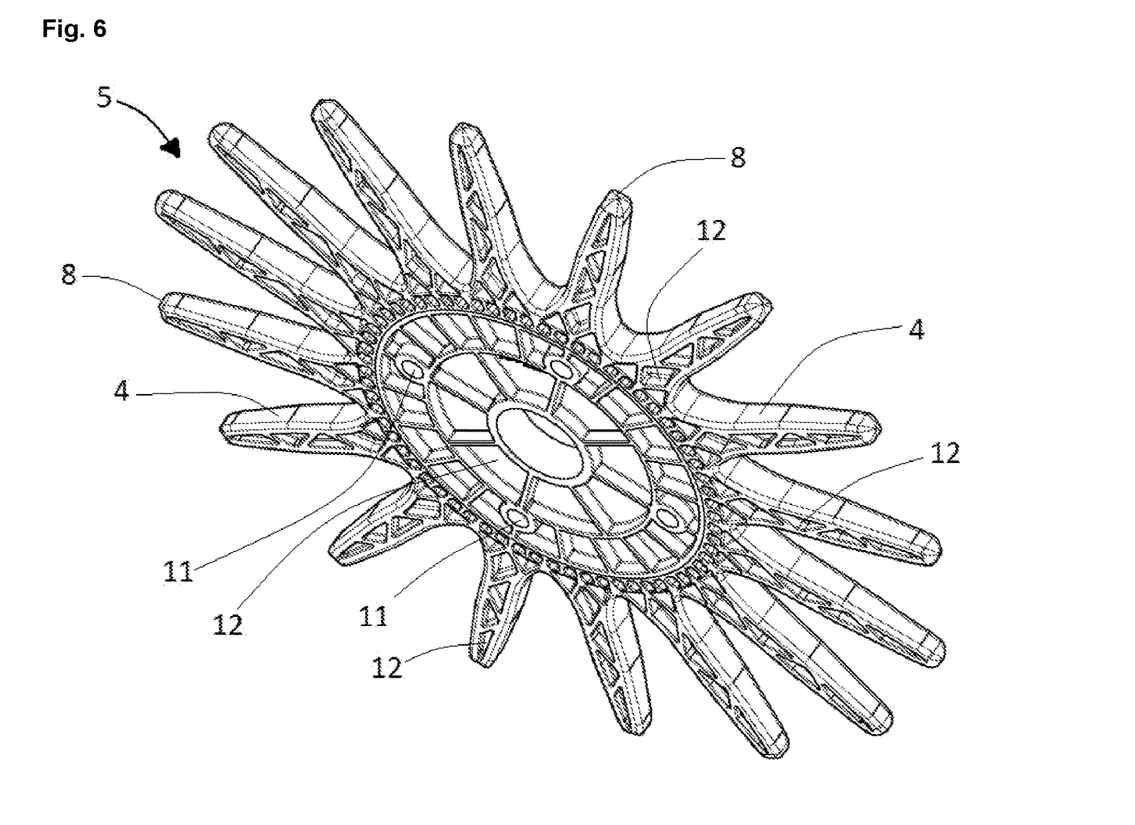
FIG. 6 shows a perspective view of a star wheel belonging to a finger-hoe tool according to the invention.
Figure 7:
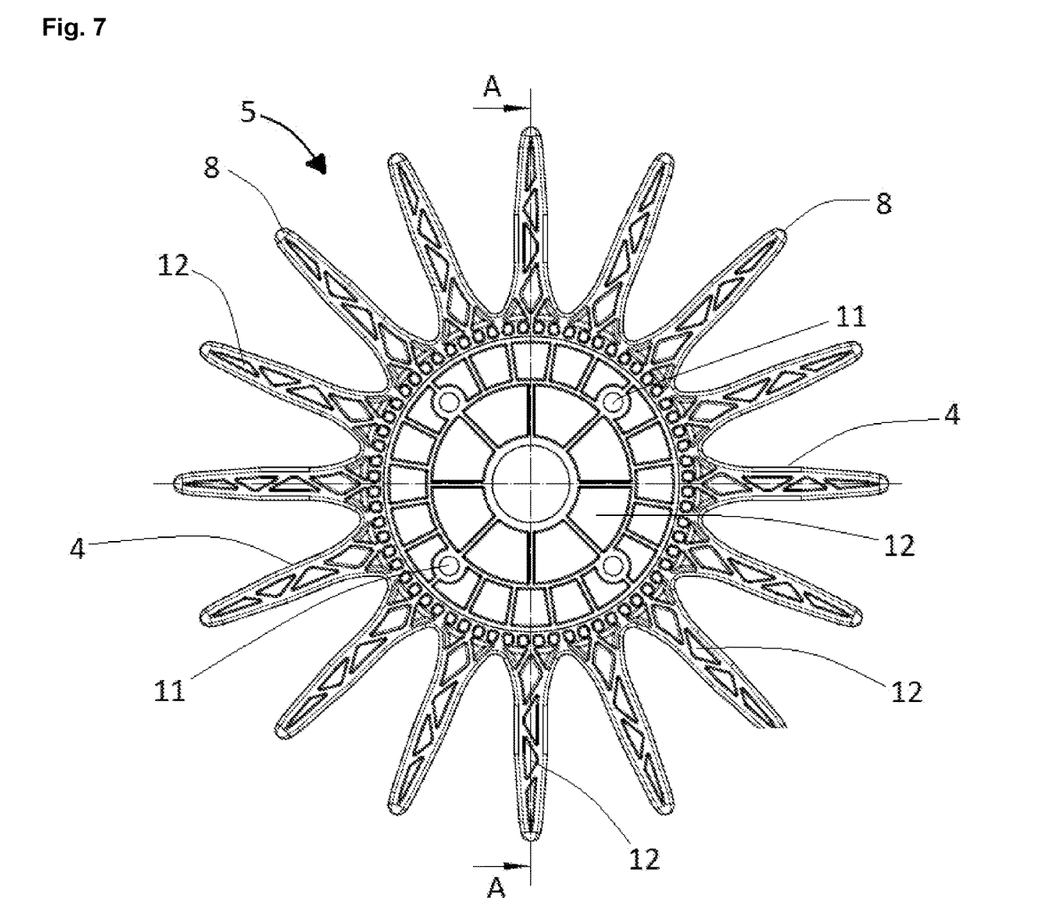
FIG. 7 shows an overhead view of the star wheel according to FIG. 6.

FIG. 6 shows a perspective view of a star wheel 5 belonging to a finger-hoe tool according to the invention, and FIG. 7 shows an overhead view of the star wheel 5 according to FIG. 6. These fingers 4 are provided with a textured surface, so that they consist not of solid material but instead are provided with means for collection and/or removal of loose materials in the form of hollows 12, which may be disposed on the upper side, on the underside and/or laterally on the star wheel 5. Hereby a savings of material is achieved, so that the star wheel 5 can be manufactured more cost-effectively.

Figure 8:
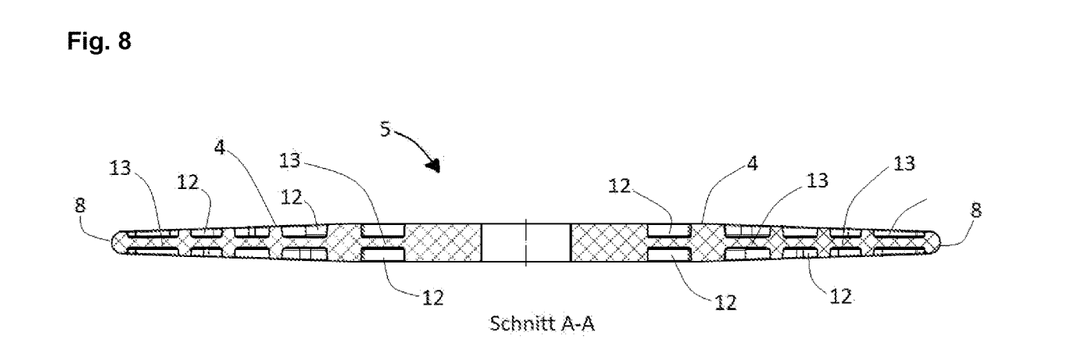
FIG. 8 shows a sectional drawing of the star wheel according to the section line A-A from FIG. 7.

FIG. 8 shows a sectional drawing of the star wheel according to section line A-A from FIG. 7. Preferably, the hollows 12, which may be configured to be equally thick or differently deep, are disposed in such a way that a middle web 13 remains between them. Preferably the middle web 13 is formed to be equally thick over the length of the finger 4, whereby the hollows 12 become progressively shallower in the direction of finger end 8. It is also conceivable for at least one part of the hollows 12, for example the hollows 12 disposed in the middle part of the star wheel 5, to be connected to one another, so that the middle web 13 is omitted and a continuous recess (opening) is formed, whereby even more material can be saved.

Figure 9:
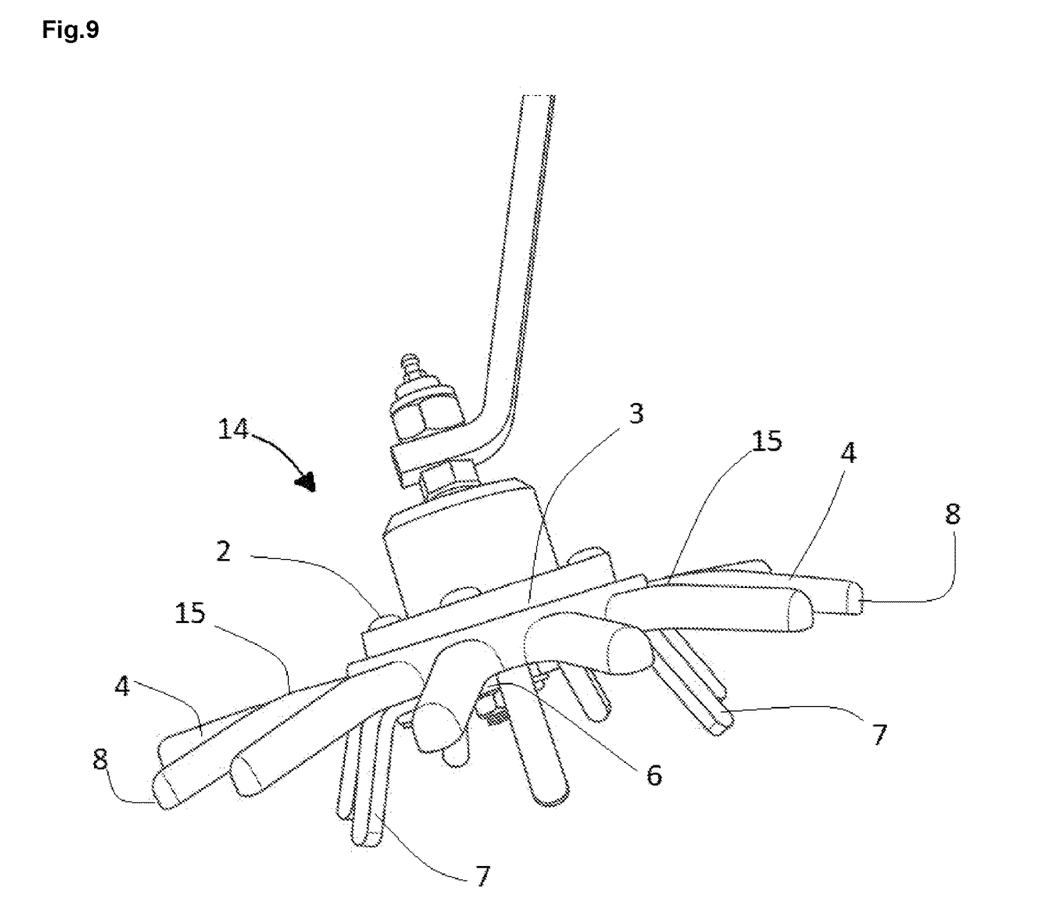
FIG. 9 shows a perspective view of a finger-hoe tool according to the invention with axially curved fingers.

FIG. 9 shows a perspective view of a finger-hoe tool 14 according to the invention with axially curved fingers 4. Beginning at a kink point 15, these fingers 4 experience a bend toward the soil.

Figure 10:
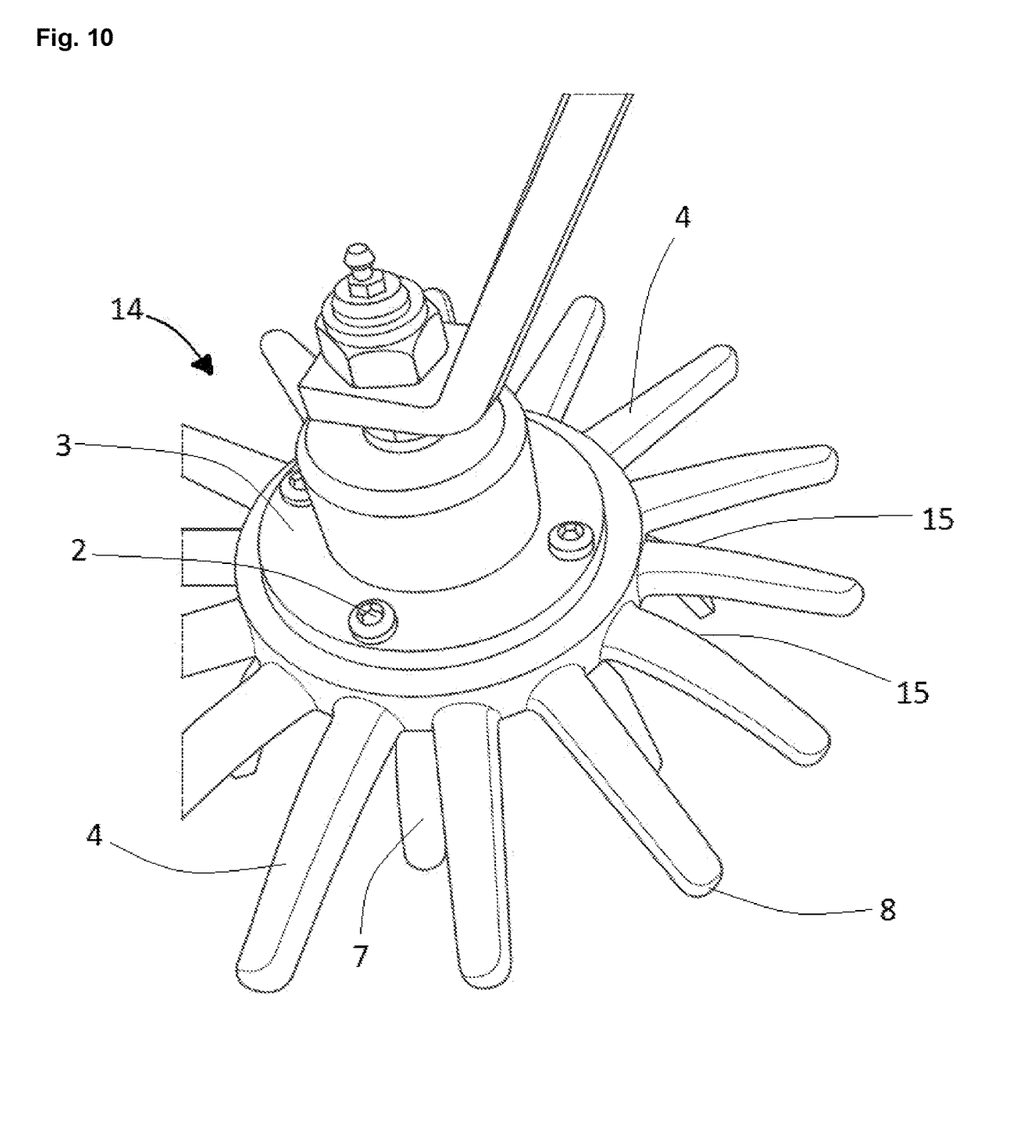
FIG. 10 shows a partial view of the finger-hoe tool according to the invention according to FIG. 9.

FIG. 10 shows a partial view of the finger-hoe tool 14 according to the invention according to FIG. 9.

Figure 11:
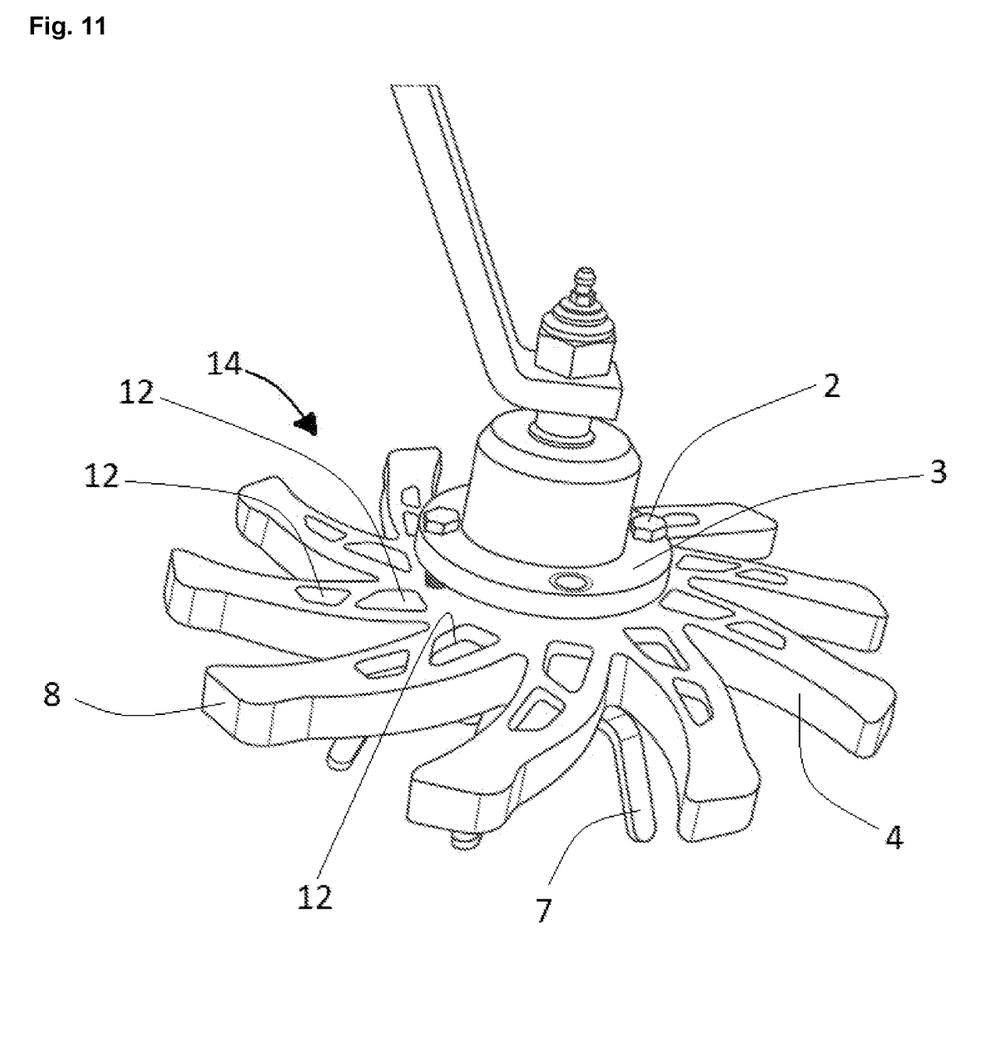
FIG. 11 shows a perspective view of a finger-hoe tool with radially curved fingers and FIG. 12 shows another view of the finger-hoe tool according to the invention according to FIG. 11.

FIG. 11 shows a perspective view of a finger-hoe tool 14 according to the invention with radially curved fingers 4.

Figure 12:
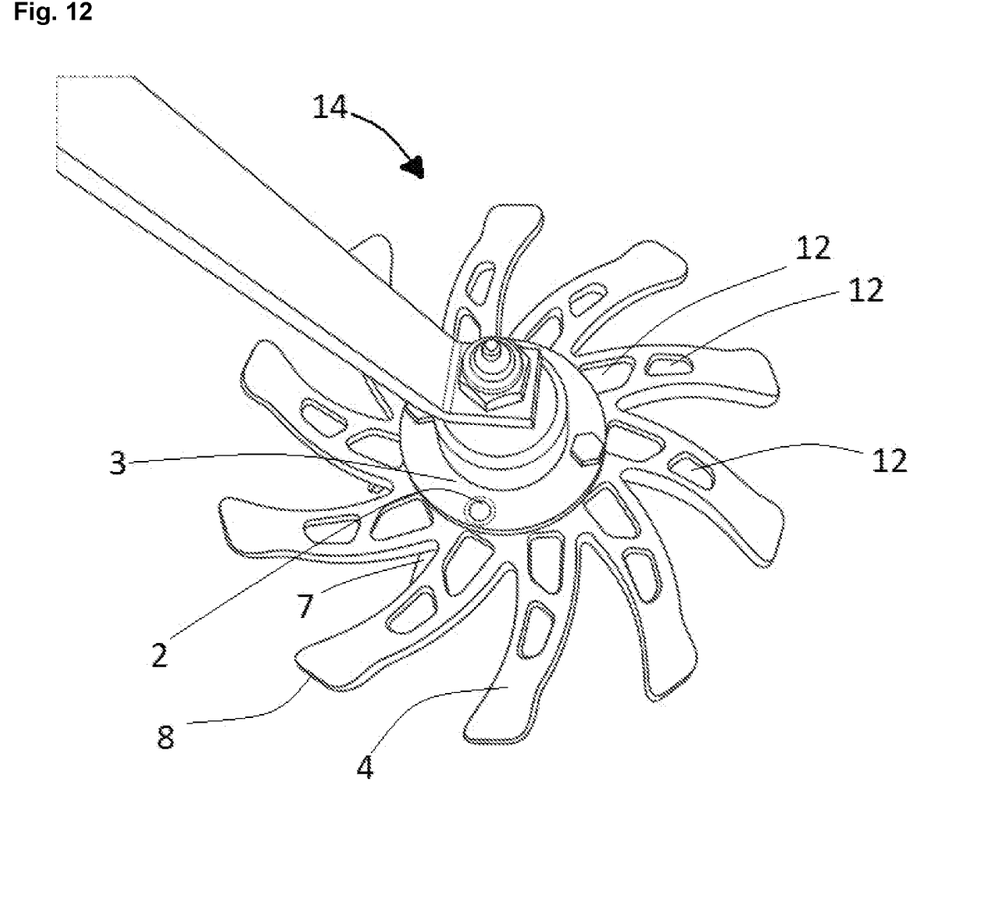

FIG. 12 shows another view of the finger-hoe tool 14 according to the invention according to FIG. 11.

All features presented in the description, the following claims and the drawing can be essential to the invention both individually as well as in any combination whatsoever with one another.

LIST OF REFERENCE SYMBOLS

1 Axis of rotation
2 Bolted connection
3 Cover plate
4 Finger
5 Star wheel
6 Drive plate
7 Soil drive element
8 Finger end
9 Projection
10 Indentation
11 Bore
12 Hollow
13 Middle web
14 Finger-hoe tool
15 Kink point

The invention claimed is:

1. A finger-hoe tool for a soil-tilling device, the finger-hoe tool comprising:
   an axis of rotation,
   a star wheel comprising a central base region, a plurality of fingers, an upper side turned away from the soil, and an underside turned toward the soil, the fingers connecting to and extending away from the central base region, the central base region being disposed in a base plane, the fingers extending in the base plane,
   a soil drive element provided with an axis of rotation, and
   at least one means for collection and/or removal of loose materials, the at least one means for collection and/or removal of loose materials being connected to a respective finger of the plurality of fingers, the at least one means for collection and/or removal of loose materials comprising:
      a projection protruding out of the base plane and/or
      a hollow protruding into the base plane,
   wherein the axis of rotation of the finger-hoe tool corresponds to the axis of rotation of the soil drive element,
   wherein the soil drive element is connected interlockingly with the star wheel, and
   wherein the at least one means for collection and/or removal of loose materials is disposed on the upper side of the star wheel and/or the underside of the star wheel.

2. The finger-hoe tool according to claim 1, wherein the at least one finger is provided with at least one finger end, and
   wherein the means for collection and/or removal of loose materials is disposed on the at least one finger end.

3. The finger-hoe tool according to claim 1, wherein the finger-hoe tool is provided at least partly with a structured surface.

4. The finger-hoe tool according to claim 1, wherein the finger-hoe tool is provided at least partly with a textured surface.

5. The finger-hoe tool according to claim 1, wherein the fingers are axially or radially curved.

6. The finger-hoe tool according to claim 1, wherein the finger-hoe tool is at least partly made of plastic.

7. A method for mechanical control of weeds in a row of crops, the method comprising:
  providing a soil-tilling device comprising:
    at least one finger-hoe tool comprising:
      an axis of rotation,
      a star wheel comprising a central base region, a plurality of fingers, an upper side turned away from the soil, and an underside turned toward the soil, the fingers connecting to and extending away from the central base region, the central base region being disposed in a base plane, the fingers extending in the base plane,
      a soil drive element comprising an axis of rotation, and
      at least one means for collection and/or removal of loose materials, the at least one means for collection and/or removal of loose materials being connected to a respective finger of the plurality of fingers, the at least one means for collection and/or removal of loose materials comprising:
        a projection protruding out of the base plane and/or
        a hollow protruding into the base plane,
      wherein the axis of rotation of the finger-hoe tool corresponds to the axis of rotation of the soil drive element,
      wherein the soil drive element is connected interlockingly with the star wheel,
      wherein the at least one means for collection and/or removal of loose materials is disposed on the upper side of the star wheel and/or the underside of the star wheel, and
  driving the soil drive element such that the star wheel and the fingers are driven.

\* \* \* \* \*